(12) United States Patent
Bohme et al.

(10) Patent No.: US 8,371,641 B2
(45) Date of Patent: Feb. 12, 2013

(54) CONSTRUCTION MACHINE, IN PARTICULAR ROAD MILLING MACHINE, MINER, RECYCLER OR STABILIZER

(75) Inventors: Heiko Bohme, Vettelschoss (DE); Thomas Kramer, Cologne (DE); Gunter Hahn, Konigswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 13/329,394

(22) Filed: Dec. 19, 2011

(65) Prior Publication Data
US 2012/0146388 A1  Jun. 14, 2012

Related U.S. Application Data

(63) Continuation of application No. 12/481,866, filed on Jun. 10, 2009, now Pat. No. 8,096,609.

(30) Foreign Application Priority Data

Jun. 18, 2008 (DE) .......................... 10 2008 028 955

(51) Int. Cl.
*B60H 1/00* (2006.01)
(52) U.S. Cl. .................................. 296/190.09
(58) Field of Classification Search ............. 296/190.09; 237/12.3 A, 12.3 B, 12.3 R; 285/272, 273, 285/274; 180/327; 165/41, 42, 43
See application file for complete search history.

(56) References Cited

U.S. PATENT DOCUMENTS

| | | | |
|---|---|---|---|
| 2,118,884 A * | 5/1938 | Fuchs ........................... | 165/253 |
| 3,112,002 A | 11/1963 | Van Der Lely | |
| 3,913,705 A | 10/1975 | Sieving | |
| 4,077,649 A | 3/1978 | Hawk | |
| 4,211,364 A | 7/1980 | Sickler | |
| 4,352,456 A * | 10/1982 | Brandenburg, Jr. ....... | 237/12.3 R |
| 4,799,621 A * | 1/1989 | Reith ............................. | 237/2 A |
| 4,940,182 A | 7/1990 | Heyne | |
| 4,946,097 A * | 8/1990 | Kawamura ..................... | 237/2 A |
| 5,044,653 A * | 9/1991 | Savanella ....................... | 280/421 |
| 5,906,411 A * | 5/1999 | Stauffer et al. .......... | 296/190.11 |
| 6,273,494 B1 | 8/2001 | Beigel | |
| 7,377,848 B2 * | 5/2008 | Voit et al. ....................... | 454/158 |
| 2004/0187509 A1 | 9/2004 | Yamakawa et al. | |
| 2006/0170251 A1 * | 8/2006 | Ishii et al. ................ | 296/190.09 |
| 2006/0202514 A1 | 9/2006 | Antonetti | |
| 2007/0205633 A1 * | 9/2007 | Waco et al. .............. | 296/190.09 |

FOREIGN PATENT DOCUMENTS

| | | |
|---|---|---|
| DE | 3807848 C2 | 8/1997 |
| DE | 29715066 U1 | 12/1997 |
| EP | 0897856 B1 | 11/2003 |
| EP | 1609701 A1 | 12/2005 |
| EP | 1669225 A1 | 6/2006 |
| WO | 9112150 A1 | 8/1991 |

OTHER PUBLICATIONS

Exhibit A: European Search Report for corresponding European Application.

* cited by examiner

*Primary Examiner* — Hilary Gutman
(74) *Attorney, Agent, or Firm* — Waddey & Patterson, P.C.; Lucian Wayne Beavers

(57) ABSTRACT

The construction machine according to the invention is distinguished by the fact that an air-processing apparatus (28) is arranged outside the cab (9) on the machine frame (2), wherein a device (13, 22) for feeding processed and/or fresh air into the cab and used air from the cab is provided, said device having a feed air duct for processed air for the cab and a discharge air duct for used air from the cab.

14 Claims, 3 Drawing Sheets

CONSTRUCTION MACHINE, IN PARTICULAR ROAD MILLING MACHINE, MINER, RECYCLER OR STABILIZER

BACKGROUND OF THE INVENTION

1. Field of the Invention

The invention relates to a construction machine, in particular a self-propelled construction machine, which has a working unit for carrying out work required for the construction measure and a control station with a cab for the vehicle driver, wherein the control station with the cab is arranged on the machine frame such as to be rotatable about a vertical axis. In particular, the invention relates to a road milling machine, a recycler or a stabilizer. However, the invention also relates to other construction machines, for example machines for the exploitation of deposits in surface mining, which are also designated as miners.

Self-propelled construction machines of varying type of construction are used in road construction and for the exploitation of deposits. Existing courses of the road pavement can be removed using the known road milling machines, existing road surfaces can be restored using the known recyclers, and the foundation for the road construction can be prepared using the known stabilizers.

2. Description of the Prior Art

The known road milling machines, recyclers or stabilizers and the known machines for the exploitation of deposits in surface mining have as a working unit a milling or cutting drum which is fitted with milling tools. In addition, such construction machines have a control station which generally has a cab for the vehicle driver.

Self-propelled construction machines are known in which the control station with the cab for the vehicle driver is arranged on the machine frame such as to be rotatable about a vertical axis, such that the vehicle driver can be brought into an optimum position for observing the operation of the machine. A control station, pivotable about a vertical axis, with cab for a construction machine is known, for example, from US 2006/0202514 A1. Agricultural vehicles which have a rotatable control station with cab are known, for example, from DE 38 07 848 C2 and DE 297 15 066 U1.

BRIEF SUMMARY OF THE INVENTION

To produce and maintain a uniform atmospheric environment, air-conditioning systems are known which are divided into different categories according to the individual functions. The air-conditioning system in the classic sense permits both heating, cooling, humidifying and dehumidifying of the air. However, air-conditioning systems which merely serve to cool a space are also known. Systems with which the air is cleaned are also known. All the systems ultimately serve to process air.

Whereas air-conditioning systems have found wide application in trucks and passenger cars, road milling machines, recyclers or stabilizers often do not have air conditioning of the cab. In particular in the construction machines in which the control station with cab is rotatably arranged on the machine frame, the installation of an air-conditioning system has hitherto been discounted in principle for design reasons, in particular when the control station with cab is mounted on the machine frame such as to be rotatable about 360° or continuously rotatable.

The object of the invention is for a construction machine having a control station, rotatably arranged on the machine frame, with cab to be equipped with an apparatus for processing air for the cab, wherein the air-processing apparatus enables the cab, which is rotatable relative to the machine frame, to be supplied with cold and/or warm air and/or humidified or dehumidified and/or cleaned air.

This object is achieved according to the invention as set forth in the claims.

The construction machine according to the invention is distinguished by the fact that the air-processing apparatus is arranged outside the cab on the machine frame, wherein a device for feeding processed air into the cab and used air from the cab is provided, said device having a feed air duct for processed air for the cab and a discharge air duct for used air from the cab. The feed air duct of the air-processing apparatus is connected to the outlet of the air-processing apparatus and the discharge air duct is connected to the inlet of the air-processing apparatus. Instead of air which has been processed in the air-processing apparatus, fresh air can also be fed. Fresh air can also be admixed to the processed air. Fresh and/or processed air can therefore be fed to the cab.

In a construction machine whose control station with cab is rotatably arranged on the machine frame, the arrangement with the air-processing apparatus outside the cab has the decisive advantage that it is not necessary to run hoses and/or lines for refrigerant and electric current or hydraulic power between the cab, which is rotatable relative to the machine frame, and the machine frame. It is certainly possible in principle to provide hoses and/or lines between rotatable parts, but sealing or making contact with the hoses and/or lines proves to be complicated or troublesome from the design point of view. Therefore air conditioning in particular of cabs which are continuously rotatable relative to the machine frame has hitherto been discounted. In contrast, the construction machine according to the invention has the advantage that sliding seals or sliding contacts are not required.

Since the air-processing apparatus is provided in or on the machine frame, the air-processing apparatus can be operated in a simple manner. For example, the units of the air-processing apparatus can be driven directly by the drive unit (engine) of the construction machine.

A preferred embodiment of the construction machine provides for the feed and discharge air duct of the air-processing apparatus to have an outer section which is formed by a component connected to the machine frame in a rotationally fixed manner and an inner section which is formed by a component connected to the cab in a rotationally fixed manner, wherein the outer section encloses at least a region of the inner section. Thus concentric air conduction via the swivel joint of the control station is possible.

In this connection, the components connected to the machine frame and respectively to the control station or the cab refer to components which can be rotated relative to one another, it being assumed that the machine frame is fixed and the control station with the cab rotates relative to the machine frame. In this case, the components need not form separate subassemblies but rather may also be part of the machine frame and of the control station, respectively.

In a preferred embodiment, the feed air duct has the outer section which is formed by the component connected to the machine frame in a rotationally fixed manner and the discharge air duct has the inner section of the air-conducting device, said inner section being formed by the component connected to the control station or the cab. However, it is also possible in principle to conduct the air the other way round, during which the feed air is fed via the inner section and the discharge air is discharged via the outer section of the air conduction.

In an especially preferred embodiment, the distribution of the air in the cab is simplified by virtue of the fact that the control station with cab has a component having a first chamber and a second chamber which are separated by a dividing wall, wherein the outer section of the feed and discharge air duct is connected to the first chamber and the inner section of the feed and discharge air duct is connected to the second chamber. The dividing wall between the two chambers prevents air from being able to pass from the feed air duct directly to the discharge air duct.

The two chambers may be of different design. The only crucial factor is that the chambers serve to conduct air in the cab. The component of the cab having the first and the second chamber preferably has a base plate and a cover plate and also a front and a rear wall and side walls, the dividing wall preferably extending between the side walls, such that the component is subdivided into a front chamber which faces the front side of the cab and into a rear chamber which faces the rear wall of the cab. Consequently, the air can be fed at the front side and returned at the rear side of the cab.

In a further especially preferred embodiment, the air-conducting component of the cab having the first and the second chamber is designed as a base part of the cab. In this embodiment, an air-directing device preferably extends upwards in the cab from the front chamber of the base part of the cab, wherein the air-directing device has one or more air outlet openings via which fresh and/or processed air can enter the cab. The rear chamber of the base part has an air outlet opening via which used air can escape from the cab. It is thus possible to feed fresh and/or processed air close to the front wall of the cab and to discharge used air in the rear part of the cab below the driver's seat.

The inner section of the feed and discharge air duct is preferably formed by a cylindrical component which passes through the base plate of the air-conducting component of the cab while forming a passage, which, however, extends only over part of the circumference of the cylindrical component. In this case, the dividing wall preferably adjoins the cylindrical component passing through the base plate, wherein the dividing wall extends over that part of the circumference of the cylindrical component which is enclosed by the passage in the base plate.

In a further especially preferred embodiment, an especially compact construction is achieved by the air-conducting component of the machine frame being separated by a dividing wall into a top and a bottom chamber which are connected to one another via a passage in the dividing wall. In this case, the air-processing apparatus can be arranged in one of the two chambers. The air-processing apparatus is preferably arranged in the top chamber.

The top chamber of the air-conducting component of the machine frame is preferably connected to the first, front chamber of the air-conducting component of the cab via the passage in the base plate of the air-conducting component of the cab, whereas the bottom chamber of the air-conducting component of the machine frame is connected to the second, rear chamber of the component of the cab via the cylindrical component.

The air-processing apparatus of the construction machine according to the invention can be an apparatus for producing cold and/or warm air and/or an apparatus for humidifying and dehumidifying air or else an apparatus for cleaning air, which has a filter or the like, for example. In a preferred embodiment of the invention, the air-processing apparatus is an air-conditioning system which permits the heating and/or cooling of the cab. However, it is also possible to provide only a heating apparatus or a cooling apparatus or an air-cleaning apparatus.

The air-processing apparatus preferably comprises only two of the units of the entire air-conditioning system, whereas the other units can be arranged in a distributed manner on the machine frame. The air-processing apparatus preferably comprises only the fan and the heater and/or evaporator of the air-conditioning system. The other units with the feed and discharge air are provided on the machine frame, the air being directed between the machine frame and the cab rotatable relative to the machine frame.

BRIEF DESCRIPTION OF THE DRAWINGS

An exemplary embodiment of the invention is explained in detail below with reference to the drawings, in which.

DETAILED DESCRIPTION OF THE INVENTION

Figure 1:
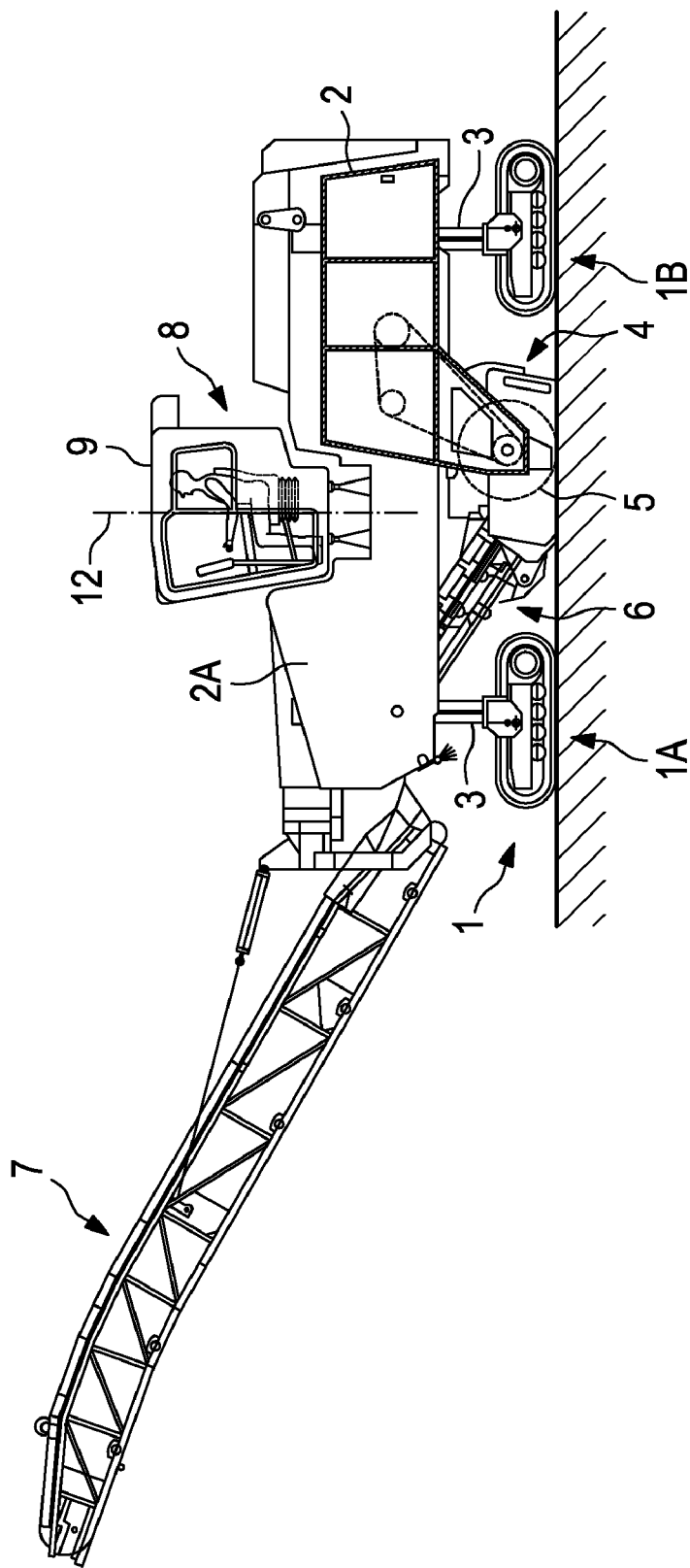
FIG. 1 shows, as an example of a construction machine, a self-propelled road milling machine in side view.

FIG. 1 shows, as an example of a self-propelled construction machine, a road milling machine for milling off road surfaces made of asphalt, concrete or the like. The road milling machine has a machine frame 2 carried by travel gear 1. The machine frame 2 has essentially vertically running lateral outer walls 2A. The travel gear 1 of the milling machine comprises, for example, four crawler tracks 1A, 1B which are arranged on the front and the rear side on both sides of the machine frame. The crawler tracks are fastened in a vertically adjustable manner to lifting columns 3 which are attached to the machine frame 2. It goes without saying that wheels may also be provided instead of crawler tracks.

The road milling machine has a working unit 4 which comprises a milling device with a milling drum 5 which is fitted with milling tools (not shown). The milling drum 5 is arranged on the machine frame between the front and the rear crawler tracks 1A, 1B. The road surface is milled off by the milling drum. Arranged in the travel direction in front of the milling drum 5 is a first conveyor apparatus 6 which transfers the milled-off material using a conveyor belt preferably to a second conveyor apparatus 7 which conveys the material using a second conveyor belt to a truck.

A control station 8 for the vehicle driver is arranged on the top side of the machine frame 2. The control station 8 is surrounded by a cab 9. The cab 9 has a front wall 9A, a rear wall 9B and side walls 9C and 9D. The front wall, rear wall and side walls have either a front window and rear window and side windows or are completely glazed (FIG. 2).

Furthermore, the road milling machine has an apparatus for processing air, said apparatus being arranged outside the cab on the machine frame. The air-processing apparatus is described below in detail with reference to FIGS. 2 to 4.

Figure 2:
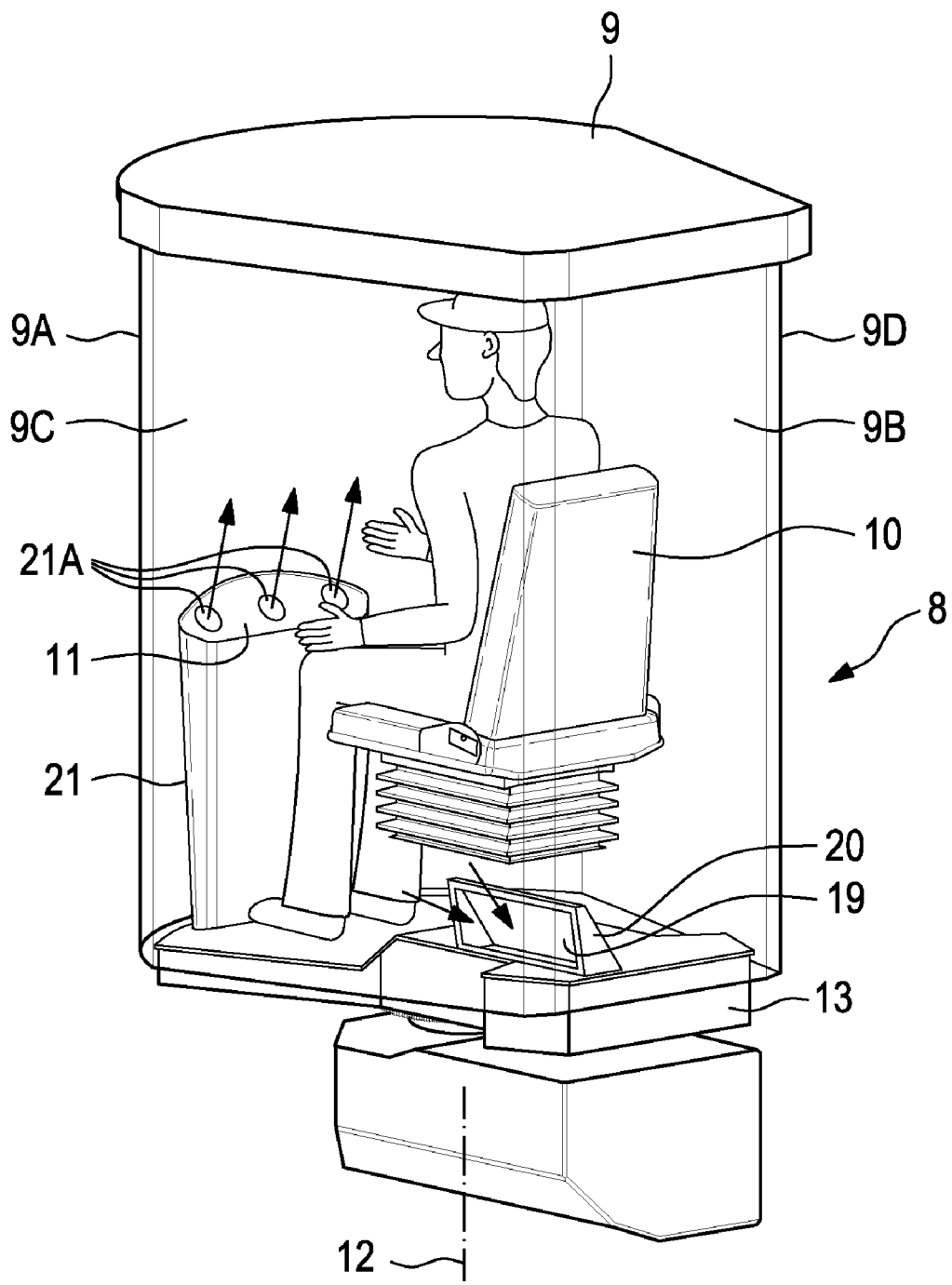
FIG. 2 shows the control station, rotatably arranged on the machine frame, with cab of the road milling machine in a partly sectioned perspective illustration.
Figure 3:
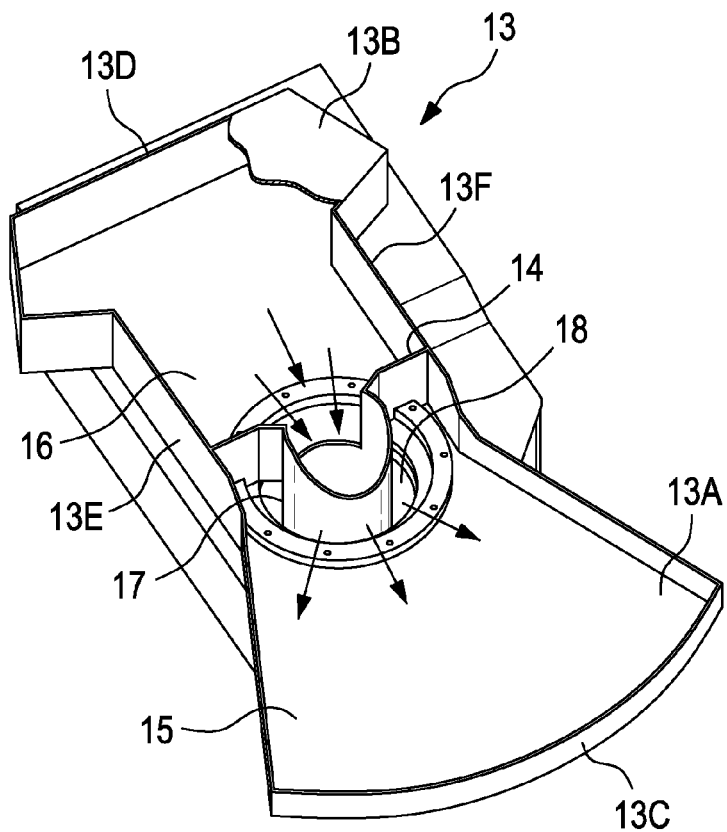
FIG. 3 shows the air-conducting component connected to the cab and the air-conducting component to be connected to the machine frame, in a partly sectioned illustration in plan view.
Figure 4:
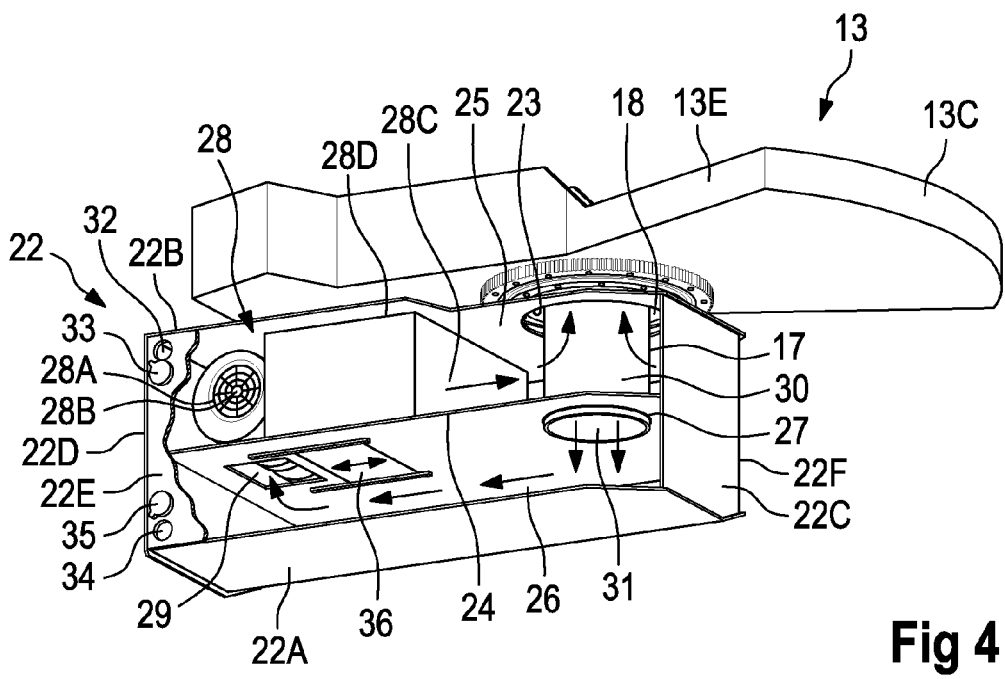
FIG. 4 shows a side view of the air-conducting component connected to the cab and of the air-conducting component to be connected to the machine frame, in a partly sectioned illustration.

FIGS. 2 to 4 are only intended to explain the principle of the invention. Therefore FIGS. 2 to 4 do not precisely show the control station 8 which is shown in the case of the road milling machine of FIG. 1. Nonetheless, the same reference numerals are used for parts corresponding to one another.

In the cab 9, a vertically adjustable driver's seat 10 is arranged in front of an operating and display console 11 (only intimated). The control station 8 with the cab 9 is rotatably mounted on the machine frame 2 about a vertical axis 12, such that the vehicle driver can be brought into an optimum position for observing the maneuvering and milling operation of the machine. The cab can be rotated relative to the machine frame in a continuous manner or can be swiveled by a relatively small angle. It is possible for the control station to also perform a translatory movement in addition to the rotary movement. For example, the control station may be displaceable on a slide transversely to the machine frame and may be rotatably mounted on the slide.

The control station 8 has a base part 13 which is fastened to the machine frame 2 of the construction machine, for example a road milling machine, in such a way as to be rotatable about the vertical axis 12. The cab 9 with the front wall 9A, the rear wall 9B and the side walls 9C and 9D sits on the base part 13 of the control station 8, the base part 13 of the control station 8 forming, as it were, the base part of the cab.

The base part 13 of the control station 8 has a base plate 13A, a cover plate 13B and a front wall 13C, a rear wall 13D and two side walls 13E, 13F (FIG. 3). Running between the side walls 13E, 13F is a dividing wall 14 which separates the base part 13 into a first, front chamber 15 and a second, rear chamber 16. Fresh and/or processed air is blown into the front chamber 15, while used air is drawn off from the rear chamber 16. The air flow is identified by arrows in FIG. 3.

A hollow-cylindrical component 17 penetrates the base plate 13A of the base part 13 while forming a passage 18 which extends over part of the circumference, for example 270°, of the hollow-cylindrical component 17. The hollow-cylindrical component 17 is the hollow-cylindrical articulated shaft of a swivel joint (only intimated), with which the control station 8 with the cab 9 is rotatably mounted on the machine frame 2.

The dividing wall 14 of the base part 13 extends between the side walls 13E, 13F of the base part 13 and over part of the circumference of the hollow-cylindrical component 17, which is surrounded by the passage 18 in the base plate 13A, such that, via the passage 18, a separate fluidic connection is produced from a box-shaped component 22 on the machine frame, which component 22 will be described below, to the front chamber 15 and via the hollow-cylindrical component 17 to the rear chamber 16 of the base part 13.

The driver's seat 10 is arranged on the cover plate 13B of the base part 13. The rear chamber 16 of the base part 13 has an air inlet opening 19 which is arranged below the driver's seat 15 in the cover plate 13B of the base part 13. Sitting on the air inlet opening 19 is a laterally open air inlet shaft 20 which is closed by a grille (not shown).

Attached to the front chamber 15 of the base part 13 is an air-directing device 21 which extends upwards from the cover plate 13B of the base part 13 in the direction of travel behind the front wall 9A of the cab 9. The air-directing device 21 has a plurality of air outlet openings 21A which are arranged behind the front wall of the cab. In the present exemplary embodiment, the housing of the air-directing device and the operating and indicating unit form a unit.

The arrows in FIG. 2 clearly show that fresh and/or processed air is blown from the air outlet openings 21A in front of the vehicle driver into the cab 9 and used air is drawn off from the cab below the driver's seat 10.

Whereas the base part 13 of the cab 9 is designed as an air-conducting component, i.e. for feeding and discharging the air into and from the cab, the machine frame 2 also has a component 22 for feeding and discharging air, this component 22 being shown in FIG. 4 in a partly sectioned illustration.

The box-shaped air-conducting component 22 on the machine frame 2 has in turn a base plate 22A, a cover plate 22B, a front wall 22C, a rear wall 22D and two side walls 22E and 22F. In the front half, the cover plate 22B of the component 22 has a circular aperture 23, through which the hollow-cylindrical component 17 extends into the box-shaped component 22. The radius of the circular aperture 23 is substantially larger than that of the hollow-cylindrical part 17 and corresponds to the radius of the passage 18 in the base plate 13A of the base part 13 of the cab 9.

The box-shaped component 22 on the machine frame 2 is divided by a horizontal dividing wall 24 into a top chamber 25 and a bottom chamber 26, the hollow-cylindrical component 17 extending through the circular aperture 23 of the cover plate 22B and a circular aperture 27 of the dividing wall 24 into the bottom chamber 26. The diameter of the circular aperture 27 of the dividing wall 24 corresponds to the diameter of the hollow-cylindrical component 17, such that only a narrow gap remains between the hollow-cylindrical component and the dividing wall, said gap being sealed by means of a seal (not shown), for example a circumferential brush or the like.

In the top chamber 25 of the box-shaped component 22, an air-processing apparatus 28 is arranged between the hollow-cylindrical component 17 and the rear wall 22D. The air-processing apparatus 28 (only shown schematically) has a fan 28A for drawing in or blowing out air and a unit 28D for processing the air and also an inlet 28B for fresh and/or used air and an outlet 28C for processed air.

Between the inlet 28B for fresh and/or used air of the air-processing apparatus 28 and the rear wall 22D of the box-shaped component 22, the horizontal dividing wall 24 has a passage 29, such that the top chamber 25 is connected to the bottom chamber 26 of the box-shaped component 22.

When the air-processing apparatus 28 is operated, processed air flows out of the outlet 28C of the air-processing apparatus, and this air is blown via the aperture 23 of the cover plate 22B of the box-shaped component 22 and via the passage 18 of the base plate 13A of the base part 13 into the front chamber 15 of the base part. From the front chamber 15 of the base part 13, the processed air then flows through the air-directing device 21 and discharges from its air outlet openings 21A. The used air, which is drawn in below the driver's seat 10 via the air inlet opening 19, flows through the rear chamber 16 of the base part 13 and the hollow-cylindrical component 17 into the bottom chamber 26 of the box-shaped component 22. Via the passage 29 in the dividing wall 24, the used air is drawn in again into the rear region of the top chamber 25 of the box-shaped component 22 by the fan 28A and is blown through the unit 28D of the air-processing apparatus 28. It is also possible for the fan 28A to be arranged downstream of the air-processing apparatus 28, such that the air is drawn into the unit 28D of the air-processing apparatus 28.

An inlet 32 for feeding fresh air is located on the side wall 22E of the top chamber 25 of the box-shaped component 22 upstream of the air-processing apparatus 28, which inlet 32 can be closed completely or partly by a flap 33 (only intimated), such that only fresh air can be fed or fresh air can be admixed to the air flow. Furthermore, an outlet 34 for used air is located on the side wall 22E of the bottom chamber 26 of the box-shaped component 22, which outlet 34 can likewise be closed completely or partly by a flap 35. Feed and discharge air ducts can be connected to the air inlet and outlet 32, 34. In addition, the passage 29 between the top and the bottom chamber 25, 26 can be closed completely or partly by a slide 36 (only intimated). The flaps 33, 35 and the slide 36 can be opened or closed by a control device (not shown) having actuating members (not shown). It is thus possible to control the feeding of fresh air. When the flaps 33, 35 are completely open and the slide 36 closed, it is possible to feed only fresh air and discharge all the used air. For pure recirculation operation the flaps 33, 35 are closed and the slide completely opened.

FIG. 4 shows that the feed and discharge air duct for conducting air into and from the cab 9 comprises an outer section 30 which is defined by the front region of the top chamber 25 of the fixed component 22 and an inner section 31 which is defined by the cylindrical component 17 of the rotatable component 13. The air flow is independent of the position in which the cab 9 is located relative to the machine frame 2, since the cross sections of flow are independent of the angular position of the cab.

In the preferred embodiment, the hollow-cylindrical component 17 is connected to the base part 13 of the control station 8 in a rotationally fixed manner, whereas the hollow-cylindrical component 17 is rotatable in the box-shaped component 22, subdivided into the top and bottom chambers 25, 26, of the machine frame. However, an opposite arrangement is also possible in which the box-shaped component subdivided into the top and bottom chambers is provided on the control station. In this embodiment, the hollow-cylindrical component 17 is then rotatably arranged in the control station and connected to the machine frame in a rotationally fixed manner.

The air-processing apparatus 28 may be an apparatus for heating and/or cooling and/or humidifying and/or dehumidifying and/or cleaning air. The system designated as air-processing apparatus is intended to be representative of all apparatuses or parts of this apparatus with which air can be heated and/or cooled and/or humidified and/or dehumidified and/or cleaned. In a preferred embodiment of the invention which provides air conditioning of the cab, the air-processing apparatus 28 is part of an air-conditioning system.

In this case, the air-processing apparatus comprises the fan and the heater/evaporator combination of the air-conditioning system, which in addition to the fan and the heater/evaporator combination has a compressor (not shown) and a condenser which are arranged outside the box-shaped component 22 on the machine frame 2.

The condenser (not shown) of the air-conditioning system is preferably arranged on the engine radiator, such that the fan (already present) of the engine can blow air through the condenser. The compressor is preferably arranged in the vicinity of the engine, such that the compressor can be driven by the engine via a belt. The compressor and the condenser are connected to the heater/evaporator combination via refrigerant lines (not shown). In addition, the heater/evaporator combination is connected to the cooling circuit of the engine of the construction machine via cooling water lines (not shown). Since the construction and functioning of an air-conditioning system are known to the person skilled in the art, the description of these details is dispensed with for the sake of clarity. All the units of the air-conditioning system with the air conduction according to the invention can be arranged outside the control station, rotatable relative to the machine frame, at the respectively optimum positions in a relatively uncomplicated manner in terms of construction. In addition, it proves to be advantageous that possible leakages in the air conduction system cannot lead to the problems which result from possible leakages or contact difficulties in a refrigerant system or hydraulic system or an electrical system. A loss of air could be compensated for simply by larger dimensioning of the air-processing apparatus, wherein the quantity of air to be expected which could escape on account of leakages ought to be so low that the existing dimensioning of the system is sufficient anyway.

What is claimed is:

1. A method of operating a construction machine, comprising:
   (a) operating a working unit connected to a machine frame from a driver's cab rotatably mounted on the machine frame;
   (b) processing air with an air processing unit mounted on the machine frame outside of the driver's cab;
   (c) feeding processed air from the air processing unit through a feed duct into the driver's cab; and
   (d) returning return air from the driver's cab through a discharge duct back to the air processing unit;
   wherein in steps (c) and (d) the processed air and the return air both flow through a swivel joint connecting the drivers cab to the machine frame.

2. The method of claim 1, further comprising:
   rotating the driver's cab relative to the machine frame during steps (b), (c) and (d).

3. The method of claim 1, wherein:
   steps (b), (c) and (d) occur simultaneously.

4. The method of claim 1, further comprising:
   driving the air processing unit directly from a drive engine of the construction machine.

5. The method of claim 1, wherein:
   as the processed air and the return air both flow through the swivel joint, one of the processed air and return air flows concentrically about the other of the processed air and the return air.

6. The method of claim 1, wherein:
   only air flows through the swivel joint, so that any loss of fluid from the swivel joint is only a loss of air and the swivel joint is free of any leakage of refrigerant or hydraulic fluid.

7. The method of claim 1, further comprising:
   recycling return air back into the processed air duct in the air processing unit.

8. The method of claim 7, further comprising:
   supplying fresh air to the processed air duct in the air processing unit.

9. The method of claim 1, further comprising:
   supplying fresh air to the processed air duct in the air processing unit.

10. The method of claim 1, further comprising:
    discharging return air to the atmosphere from the air processing unit.

11. A method of manufacturing a construction machine, comprising:
    (a) connecting a working unit to a machine frame so that the working unit can work a ground surface;
    (b) rotatably mounting a driver's cab on the machine frame with a rotatable connection;
    (c) mounting an air processing unit on the machine frame separate from the driver's cab so that the air processing unit remains fixed relative to the machine frame when the driver's cab rotates relative to the machine frame; and
    (d) communicating both processed air from the air processing unit to the driver's cab and return air from the driver's cab to the air processing unit through the rotatable connection.

12. The method of claim 11, wherein:
in step (b), the driver's cab is rotatable about 360° relative to the machine frame.

13. The method of claim 11, wherein:
in step (d), one of the processed air and the return air flows through the rotatable connection concentrically about the other of the processed air and the return air.

14. The method of claim 11, wherein:
only air flows through the rotatable connection, so that any loss of fluid from the rotatable connection is only a loss of air and the rotatable connection is free of any leakage of refrigerant or hydraulic fluid.

* * * * *